No. 847,766. PATENTED MAR. 19, 1907.
W. C. HANSON.
TRUCK.
APPLICATION FILED MAR. 29, 1906.
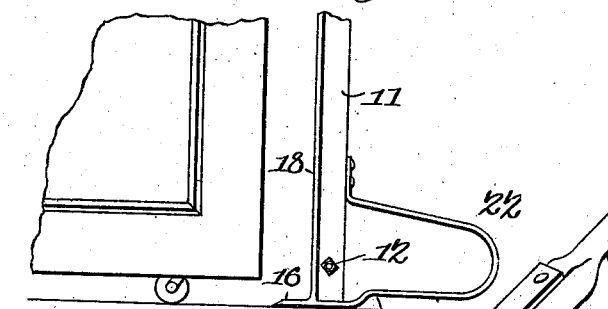
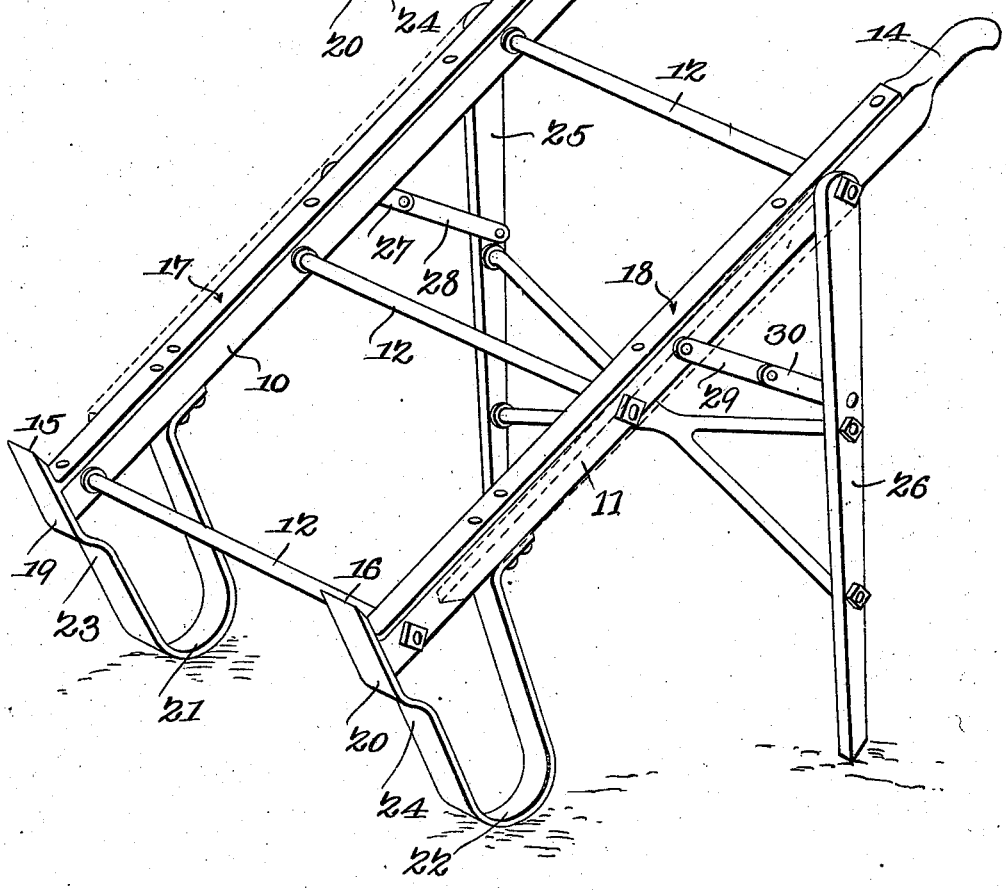
WITNESSES:
William C. Hanson
INVENTOR
By C. A. Snow & Co
ATTORNEYS

UNITED STATES PATENT OFFICE.

WILLIAM CHARLES HANSON, OF CEDAR RAPIDS, IOWA.

TRUCK.

No. 847,766.  Specification of Letters Patent.  Patented March 19, 1907.

Application filed March 29, 1906. Serial No. 308,757.

*To all whom it may concern:*

Be it known that I, WILLIAM CHARLES HANSON, a citizen of the United States, residing at Cedar Rapids, in the county of Linn and State of Iowa, have invented a new and useful Truck, of which the following is a specification.

This invention relates to devices employed for assisting in handling relatively heavy bodies, such as pianos and the like, and has for its object to improve the construction and increase the efficiency and utility of devices of this character.

With this and other objects in view, which will appear as the nature of the invention is better understood, the invention consists in certain novel features of construction, as hereafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a perspective view of the improved device in elevated position. Fig. 2 is a detail of a portion of the device, illustrating its operation.

The improved device comprises a supporting-frame formed with spaced side members 10 11, connected at suitable intervals by transverse members, preferably in the form of rods 12 and of suitable length and width. The frame may be of any required size and of any suitable material, and when employed for handling pianos and similar articles the side members will be about five feet long and about two and one-half feet apart; but these dimensions may be varied as circumstances may require.

The side members 10 11 are provided at one end with handles 13 14 and at the other end with "toes" 15 16, extending laterally therefrom at one side, the toes formed of relatively thin metal and wedge or knife shaped, so that they may be readily entered beneath the article to be lifted by the truck.

The upper surfaces of the side members 10 11 will preferably be bound with wear-strips 17 18, the wear-strips being integral with the toe portions 15 16 and the latter extended past the ends of the side members 10 11 for a distance, as indicated at 19 20. The strips 17 and 18 are continued into the portions 19 and 20, which are located at the ends of the members 10 and 11, respectively. The said strips are then continued into the brackets 21 and 22, which are rounded at their lower portions and are secured at their rear ends to the under sides of the members 10 and 11. The forward portion of each of the brackets 21 and 22 is bent rearwardly, as at 23 and 24, in order that the said brackets may not lie flat upon the ground when the truck is turned up upon its end. The wear-plates 17 18, toes 15 16, with their extensions 19 20, and the brackets 21 22 are preferably formed integrally and of steel or other metal of sufficient strength to withstand the strains to which they will be subjected. Swinging from the side members 10 11, relatively near the handle portions 13 14, are braces or supports 25 26 and coupled to the side members by jointed bars 27 28 and 29 30, the jointed bars thus foldable with the braces or supports when not in use, as represented by dotted lines in Fig. 1.

With a device thus constructed when a body is to be moved—such as, for instance, a piano—the framework is disposed in a vertical position and the toe portions 15 16 thrust beneath the piano, preferably from the rear. This brings the flat portions between the toes 15 16 and the terminals 19 20 upon the floor or ground, and when the workman grasps one of the handles 13 or 14 with one hand and the front upper corner of the piano or other article with the other hand and pulls the whole backward or toward himself the points 19 20 are transformed into fulcrums to the relatively long leverage of the frame and enables him to easily tilt the piano backwardly until the rounded ends of brackets 21 22 bear upon the ground. The load upon the frame may then be still further tilted with the expenditure of a small amount of force until it is "balanced" upon the brackets, when it may be supported in that position by releasing supports 25 26 and the locking-bars 27 28 and 29 30. The load upon the frame is then in position to be very easily transferred to a wheel-truck or any of the ordinary piano trucks or carriers in common use and without the necessity for lifting the piano bodily upon the same.

The device is simple in construction, can be inexpensively manufactured, is strong and durable, and is very useful for handling relatively heavy bodies, such as pianos and the like, and will materially lessen the labor required in work of this character.

Having thus described the invention, what is claimed as new is—

1. In a device of the class described, a frame comprising spaced side members having transverse coupling members, lifting-toes extending laterally from said frame members at one end, brackets integral with said toes and extending laterally from said frame members at the opposite side and spaced from the adjacent ends of the same, braces swinging from said frame members and adapted to support the frame in an inclined position, and locking means operating to maintain said braces in extended position.

2. A truck comprising side members, strips attached to the upper edges thereof, said strips merging into upwardly-extending toes at the lower ends of the members and being continued into brackets the rear ends of which are attached to the under edges of the said members.

3. A truck comprising side members, strips attached to the upper edges thereof and merging into upwardly-extending toes at the lower ends of said members then being bent rearwardly below said members and continued into brackets the rear ends of which are attached to the under edges of the members.

In testimony that I claim the foregoing as my own I have hereto affixed my signature in the presence of two witnesses.

WILLIAM CHARLES HANSON.

Witnesses:
FRANK H. RENO,
CHAS. KEEBISS.